(12) United States Patent
Shimizu (10) Patent No.: US 8,941,756 B2
(45) Date of Patent: Jan. 27, 2015

(54) IMAGE PROCESSING APPARATUS, IMAGE PROCESSING METHOD, AND PROGRAM

(75) Inventor: Yusuke Shimizu, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 127 days.

(21) Appl. No.: 13/221,444

(22) Filed: Aug. 30, 2011

(65) Prior Publication Data

US 2012/0057045 A1    Mar. 8, 2012

(30) Foreign Application Priority Data

Sep. 2, 2010    (JP) ................................. 2010-196827

(51) Int. Cl.
*H04N 9/73* (2006.01)
(52) U.S. Cl.
CPC .................................... *H04N 9/735* (2013.01)
USPC ..................................................... 348/223.1
(58) Field of Classification Search
CPC .............................. H04N 5/2354; H04N 9/735
USPC .......... 348/223.1, 222.1, 227.1; 382/162, 167
See application file for complete search history.

(56) References Cited

U.S. PATENT DOCUMENTS

| | | | |
|---|---|---|---|
| 5,808,681 A | 9/1998 | Kitajima | |
| 7,283,166 B1 * | 10/2007 | Billman | 348/255 |
| 7,423,674 B2 * | 9/2008 | Takeshita | 348/223.1 |
| 7,590,344 B2 * | 9/2009 | Petschnigg | 396/155 |
| 8,111,302 B2 * | 2/2012 | Ajito | 348/223.1 |
| 8,462,228 B2 * | 6/2013 | Nakamura | 348/224.1 |
| 2004/0105017 A1 * | 6/2004 | Aotsuka | 348/223.1 |
| 2005/0195290 A1 | 9/2005 | Takeshita | |
| 2006/0203120 A1 * | 9/2006 | Jun | 348/364 |
| 2006/0284991 A1 * | 12/2006 | Ikeda | 348/223.1 |
| 2007/0024742 A1 | 2/2007 | Raskar et al. | |
| 2007/0165960 A1 * | 7/2007 | Yamada | 382/254 |
| 2007/0201853 A1 * | 8/2007 | Petschnigg | 396/155 |
| 2008/0094484 A1 | 4/2008 | Wu | |
| 2010/0045848 A1 | 2/2010 | Sugimoto et al. | |
| 2010/0149374 A1 | 6/2010 | Takahashi et al. | |
| 2012/0026308 A1 * | 2/2012 | Johnson et al. | 348/77 |

FOREIGN PATENT DOCUMENTS

| | | |
|---|---|---|
| CN | 1846447 A | 10/2006 |
| CN | 1885952 A | 12/2006 |
| CN | 101088297 A | 12/2007 |
| CN | 101179663 A | 5/2008 |
| CN | 101283604 A | 10/2008 |

(Continued)

*Primary Examiner* — Aung S Moe
*Assistant Examiner* — Amy Hsu
(74) *Attorney, Agent, or Firm* — Canon U.S.A., Inc. IP Division (57) ABSTRACT

The present invention generates first developed image data by correcting image data with use of a first white balance correction value corresponding to a first light source, generates second developed image data by correcting the image data with use of a second white balance correction value corresponding to a second light source, calculates a color evaluation value of each of blocks by adding and averaging color evaluation values of pixels in the image data for each of the divided blocks, calculates a combining ratio based on a difference between the calculated color evaluation value of each of the blocks and a color evaluation value of white under the second light source, and combines the first developed image data and the second developed image data according to the calculated combining ratio.

16 Claims, 9 Drawing Sheets

(56) References Cited

FOREIGN PATENT DOCUMENTS

| | | |
|---|---|---|
| CN | 101350883 A | 1/2009 |
| CN | 101527860 A | 9/2009 |
| JP | 2000-092509 A | 3/2000 |
| JP | 2003-143611 A | 5/2003 |
| JP | 3540485 B2 | 7/2004 |
| JP | 2005-033609 A | 2/2005 |
| JP | 2005-347811 A | 12/2005 |
| JP | 2006-129442 A | 5/2006 |
| JP | 2007-129622 A | 5/2007 |
| JP | 2008-109505 A | 5/2008 |
| JP | 2009-201125 A | 9/2009 |

* cited by examiner

IMAGE PROCESSING APPARATUS, IMAGE PROCESSING METHOD, AND PROGRAM

BACKGROUND OF THE INVENTION

1. Field of the Invention

The present invention relates to a white balance correction of an image captured by an imaging apparatus.

2. Description of the Related Art

Generally, imaging apparatuses using an image sensor such as a digital camera and a digital video camera are provided with the white balance control function for adjusting a color tone of an image captured by an imaging operation. This white balance control includes manual white balance control which acquires a white balance coefficient by imaging a white object in advance and applies the calculated white balance coefficient to the entire screen. Further, the white balance control includes automatic white balance control which automatically detects a possible white portion from a captured image, calculates a white balance coefficient from an average value of each color component in the entire screen, and applies the calculated white balance coefficient to the entire screen.

Figure 3:
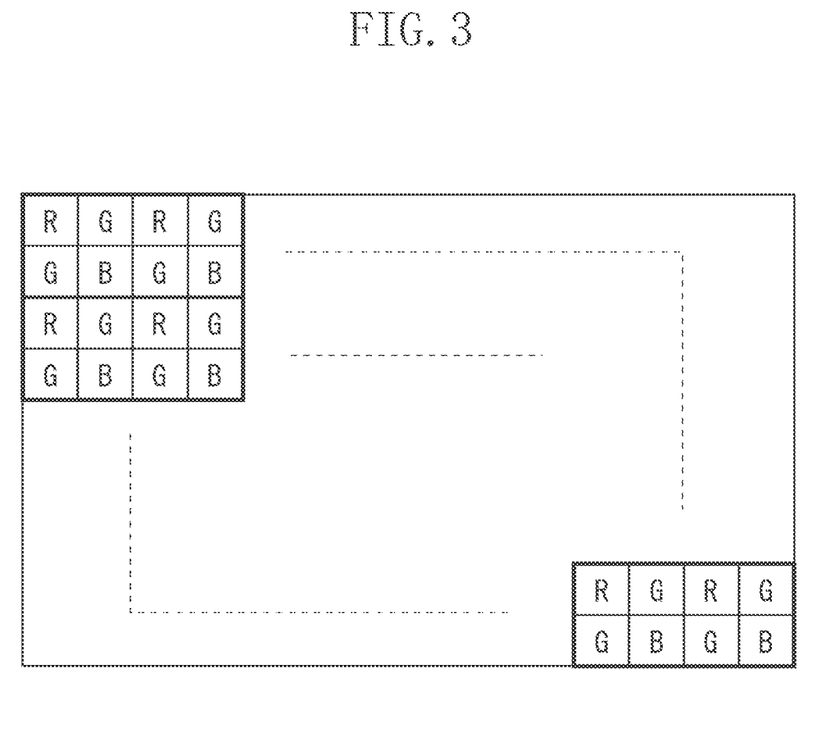
FIG. 3 illustrates blocks each constituted by R, G, and B color pixels.

Now, a conventional method of the automatic white balance control will be described. An analog signal output from an image sensor is converted into a digital signal by analog/digital (A/D) conversion, and is divided into a plurality of blocks as illustrated in FIG. 3. Each of the blocks is constituted by red (R), green (G), and blue (B) color pixels, and a color evaluation value ($Cx[i]$, $Cy[i]$) is calculated for each block by, for example, the following equation (1).

$$Cx[i]=(R[i]-B[i])/Y[i]\times 1024 \quad Cy[i]=(R[i]+B[i]-2G[i])/Y[i]\times 1024 \quad \text{[EQUATION 1]}$$

(In this equation, i represents a block number, $R[i]$, $G[i]$, and $B[i]$ each represent an average value of RGB pixels included in the block i, and $Y[i]=(R[i]+2G[i]+B[i])/4$.)

Then, if the calculated color evaluation value ($Cx[i]$, $Cy[i]$) falls within a preset white detection range, that block is determined as a white block. Then, the summation value (SumR, SumG, SumB) of the color pixels included in such blocks is calculated, and the white balance coefficient (WBCo_R, WBCo_G, WBCo_B) is calculated by the following equation (2).

$$WBCo\_R=SumY\times 1024/sumR \quad WBCo\_G=SumY\times 1024/sumG \quad WBCo\_B=SumY\times 1024/sumB \quad \text{[EQUATION 2]}$$

(In this equation, $SumY=(sumR+2\times sumG+sumB)/4$.)

However, such automatic white balance control has the following problem; even in a scene where there is a plurality of different light sources in an image, an imaging apparatus performs the white balance control by applying the white balance coefficient calculated as mentioned above to the entire screen. Therefore, it is difficult to perform the white balance control so as to achieve appropriate color tints for all of the light sources. For example, in a scene where an imaging apparatus emits flash light which is a light source having a high color temperature, if the ambient light contains a low color temperature light source such as a light bulb color source, the white balance controlled on the basis of the flash light results in unsuitable white balance for the low color temperature light source in the ambient light. On the other hand, the white balance controlled on the basis of the low color temperature light source of the ambient light results in unsuitable white balance for the flash light. Further, even if the imaging apparatus performs the white balance control by adjusting the white balance to the middle between the respective light sources, this results in unsuitable white balance for both of the light sources, leading to generation of an image in which a region irradiated with the flash light is tinged with blue while a region irradiated with the low color temperature light source is tinged with red.

Therefore, to solve this problem, for example, the technique discussed in Japanese Patent No. 3540485 calculates a data ratio by comparing an image captured with the flash on, to an image captured with the flash off for each arbitrary object region, and determines a degree of contribution of the flash light based on the calculated ratio value. Then, this technique performs the white balance control by selecting a white balance control value for each region as to video data captured by carrying out an exposure with the flash light on according to a degree of contribution.

However, the conventional technique discussed in Japanese Patent No. 3540485 is designed to be used in white balance control of an image captured while the flash light is emitted, and cannot be applied to an image captured while the flash light is not emitted. Further, this conventional technique performs a development process after varying the white balance control value for each region, whereby other control such as color reproduction may become inappropriate to the white balance control value. As a result, the conventional technique cannot fully reproduce an appropriate tint.

SUMMARY OF THE INVENTION

To solve the above-mentioned problems, the present invention, in one aspect, is directed to generation of an image achieving an appropriate tint, even when there is a plurality of light sources.

According to an aspect of the present invention, an image processing apparatus includes a correction unit configured to generate, from scene image data, first developed image data by correcting the scene image data with use of a first white balance correction value corresponding to a first light source of the scene, and generate second developed image data by correcting the scene image data with use of a second white balance correction value corresponding to a second light source of the scene, a division unit configured to divide the scene image data into a plurality of blocks, a color evaluation value calculation unit configured to calculate a color evaluation value of each of the blocks by adding and averaging values of pixels in the scene image data for each of the blocks divided by the division unit, a combining ratio calculation unit configured to calculate a combining ratio based on a difference between the color evaluation value of each block which is calculated by the color evaluation value calculation unit, and a color evaluation value of white under the second light source, and a combining unit configured to combine the first developed image data and the second developed image data generated by the correction unit according to the combining ratio.

Aspects of the invention may also provide a computer program and a computer program product for carrying out any of the methods described herein and/or for embodying any of the apparatus features described herein, and a computer readable medium having stored thereon a program for carrying out any of the methods described herein and/or for embodying any of the apparatus features described herein. Aspects of the invention may extend to methods, apparatus and/or use substantially as herein described with reference to the accompanying drawings. Any feature in one aspect of the invention may be applied to other aspects of the invention, in any appropriate combination. In particular, features of method aspects may be applied to apparatus aspects, and vice versa. Furthermore, features implemented in hardware may generally be implemented in software, and vice versa. Any reference to software and hardware features herein should be construed accordingly. Further preferred features and aspects of the present invention will now be described by way of example with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

DESCRIPTION OF THE EMBODIMENTS

Various exemplary embodiments, features, and aspects of the invention will be described in detail below with reference to the drawings.

Figure 1:
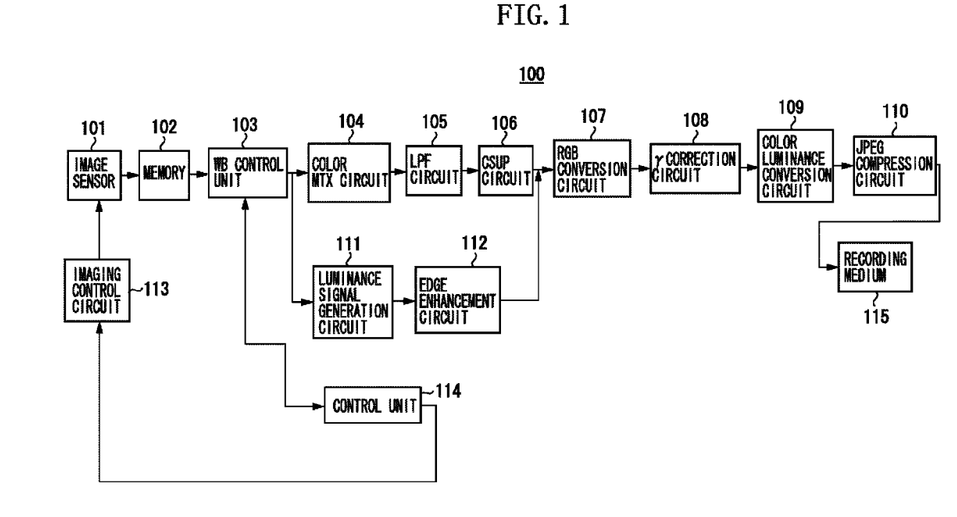
FIG. 1 is a block diagram illustrating an example of a configuration of a digital camera according to an exemplary embodiment of the present invention.

Hereinafter, a useful exemplary embodiment of the present invention will be described in detail with reference to the accompanying drawings. FIG. 1 is a block diagram illustrating an example of a configuration of a digital camera 100 according to the present exemplary embodiment. Referring to FIG. 1, a solid image sensor 101 is an image sensor constituted by, for example, a charge coupled device (CCD) or a complementary metal oxide semiconductor (CMOS). The surface of the solid image sensor 101 is covered with, for example, an RGB color filter such as the Bayer array to enable color photography. When an object image is formed on the solid image sensor 101, the solid image sensor 101 generates image data (image signal) which is then stored in a memory 102.

A control unit 114 calculates such a shutter speed and a diaphragm value that an entire image is lightened up, and calculates a drive amount of a focus lens so as to focus on an object located within a focusing region. Then, the information calculated by the control unit 114, i.e., the exposure value (the shutter speed and the diaphragm value) and the drive amount of the focus lens are transmitted to an imaging control circuit 113, and the corresponding units and parts are controlled according to the respective values. A white balance (WB) control unit 103 calculates a WB correction value based on the image signal stored in the memory 102, and applies a WB correction to the image signal stored in the memory 102 with use of the calculated WB correction value. The details of the configuration of the WB control unit 103 and the method for calculating the WB correction value will be described later.

A color conversion matrix circuit 104 converts the image signal, to which the WB control unit 103 has applied the WB correction, into a color-difference signal R-Y/B-Y by multiplying the image signal by a color gain so that the image signal can be reproduced in an optimal color. A low pass filter (LPF) circuit 105 is a circuit to limit the band of the color-difference signal R-Y/B-Y. A chroma suppress (CSUP) circuit 106 is a circuit to remove a false color signal of a saturated portion in the image signals in which a band is limited by the LPF circuit 105.

On the other hand, the image signal to which the WB control unit 103 has applied the WB correction is also output to a luminance signal generation circuit 111. The luminance signal generation circuit 111 generates a luminance signal Y from the input image signal. An edge enhancement circuit 112 applies the edge enhancement processing to the generated luminance signal Y.

An RGB conversion circuit 107 converts the color difference signal R-Y/B-Y output from the CSUP circuit 106 and the luminance signal Y output from the edge enhancement circuit 112 into an RGB signal. A gamma correction circuit 108 applies a gradation correction to the converted RGB signal. After that, a color luminance conversion circuit 109 converts the RGB signal with the corrected gradation into a YUV signal. Further, a Joint Photographic Experts Group (JPEG) compression circuit 110 compresses the converted YUV signal by, for example, the JPEG method, and stores the compressed data in an external or internal recording medium 115 as an image signal.

Figure 5:
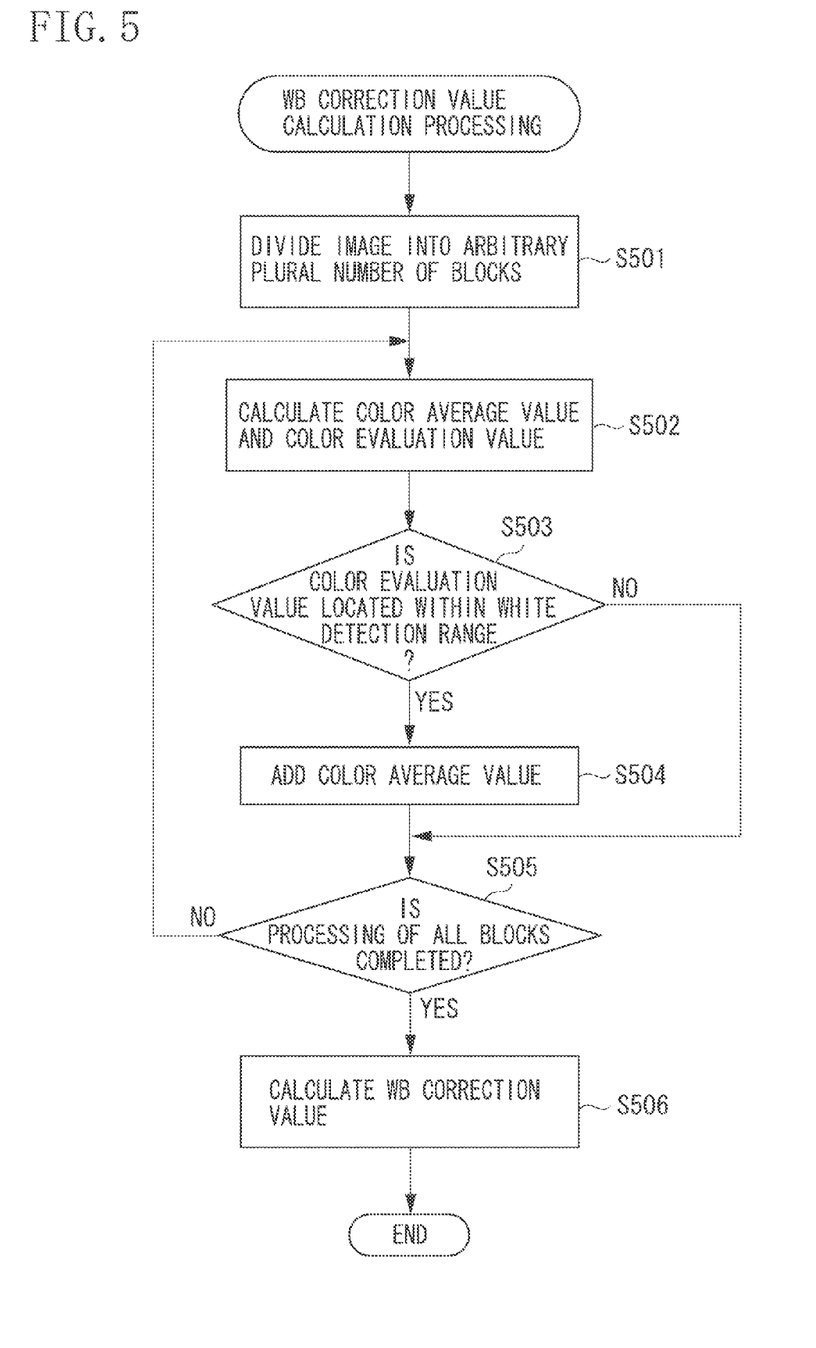
FIG. 5 is a flowchart illustrating an example of processing for determining a first WB correction value.

Next, the method in which the WB control unit 103 calculates the WB correction value will be described in detail. FIG. 5 is a flowchart illustrating an example of a processing procedure that the WB control unit 103 performs to determine a first white balance correction value (first WB correction value). As will be used herein, the first WB correction value refers to a correction value calculated by normal white balance control for an image captured under a first light source.

First, in step S501, the WB control unit 103 reads out an image signal stored in the memory 102, and divides the image space into an arbitrary number m of blocks. Then, in step S502, for each of the m blocks, the WB control unit 103 adds and averages the pixel values for each color to calculate a color average value (R[i], G[i], B[i]). Then, the WB control unit 103 further calculates a color evaluation value (Cx[i], Cy[i]) with use of the following equation (3).

$$Cx[i]=(R[i]-B[i])/Y[i]\times 1024 \quad Cy[i]=(R[i]+B[i]-2G[i])/Y[i]\times 1024 \quad \text{[EQUATION 3]}$$

(In this equation, $Y[i]=(R[i]+2G[i]+B[i])/4$.)

Subsequently, in step S503, the WB control unit 103 performs white detection to determine whether the color evaluation value is within a white detection range. Now, the method of the white detection will be described.

Figure 4A:
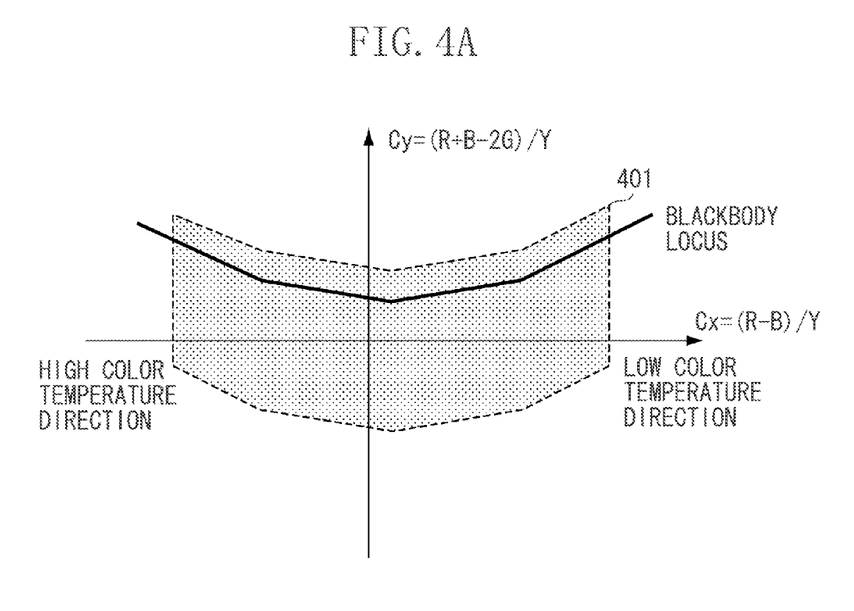
FIGS. 4A and 4B are characteristic charts each illustrating an example of the relationship of a color evaluation value for white detection.
Figure 4B:
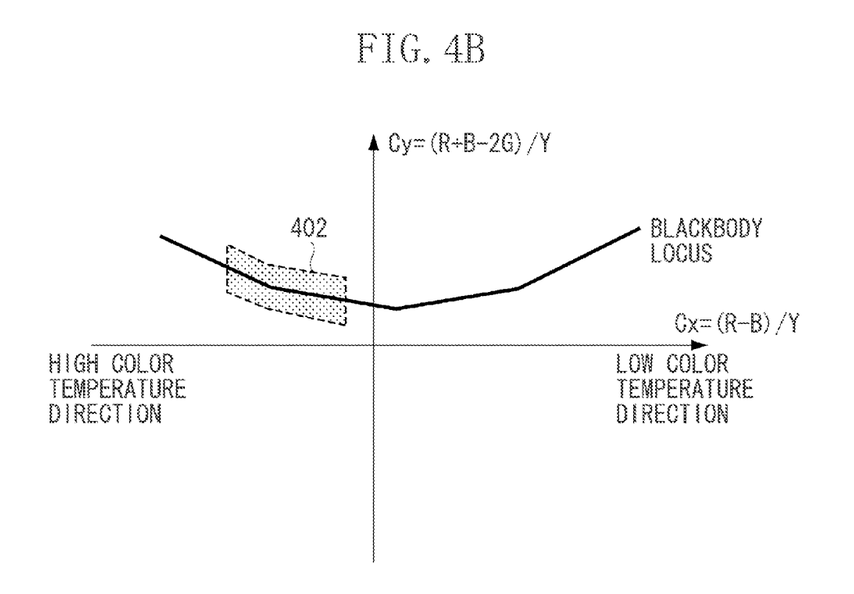

FIGS. 4A and 4B are characteristic charts each indicating the relationship of the color evaluation value for use in the white detection. In FIG. 4A, the negative direction of the x axis (Cx) represents the color evaluation value when white of a high color temperature object is imaged, while the positive direction of the x axis represents the color evaluation value when white of a low color temperature object is imaged. Further, the y coordinate (Cy) represents a degree of the green component of a light source. As the value is increased in the negative direction of the y axis, the green component is increased, which indicates that the light source is a fluorescent bulb. In step S503, the WB control unit 103 determines whether the color evaluation value (Cx[i], Cy[i]) of the i-th block calculated in step S502 is located within a preset white detection range 401 illustrated in FIG. 4A.

The white detection range 401 illustrated in FIG. 4A is defined by shooting a white image under different light sources in advance and plotting calculated color evaluation values along a blackbody locus. This white detection range 401 can be set so as to have a different range depending on a shooting mode. If the calculated color evaluation value (Cx[i], Cy[i]) is located within this white detection range 401 (YES in step S503), the WB control unit 103 determines that this block is white. Then, in step S504, the WB control unit 103 adds and calculates the color average value (R[i], G[i], B[i]) of that block. On the other hand, if the calculated color evaluation value is not located within the white detection range 401 (NO in step S503), the processing proceeds to step S505 without adding the color average value of that block. In this calculation in step S5504, the WB control unit 103 adds the color average values (R[i], G[i], B[i]) with use of the following equation (4).

$$SumR1 = \sum_{i=0}^{m} Sw[i] \times R[i]$$

$$SumG1 = \sum_{i=0}^{m} Sw[i] \times G[i]$$

$$SumB1 = \sum_{i=0}^{m} Sw[i] \times B[i]$$

[EQUATION 4]

In this equation (4), Sw[i] is set to 1 if the color evaluation value (Cx[i], Cy[i]) is located within the white detection range 401, while Sw[i] is set to 0 if the color evaluation value (Cx[i], Cy[i]) is not located within the white detection range 401. Setting Sw[i] in this way enables the WB control unit 103 to perform or skip the addition process of the color average value (R[i], G[i], B[i]).

Subsequently, in step S505, the WB control unit 103 determines whether the WB control unit 103 has decided whether the color evaluation value is located within the color detection range 401 for all of the blocks. As a result of the determination in step S505, if there is any block left to be processed (NO in step S505), the processing returns to step S502. If all of the blocks are processed (YES in step S505), the processing proceeds to the next step, step S506. In this way, when the WB control unit 103 has finished the processing for all of the blocks, the summation value (SumR1, SumG1, SumB1) in the equation (4) is determined.

Subsequently, in step S506, the WB control unit 103 calculates a first WB correction value (WBCol_R1, WBCol_G1, WBCol_B1) from the determined summation value (SumR1, SumG1, SumB1) of the color average values with use of the following equation (5).

$WBCol\_R1 = SumY1 \times 1024/SumR1$ $WBCol\_G1 = SumY1 \times 1024/SumG1$ $WBCol\_B1 = SumY1 \times 1024/SumB1$ (EQUATION 5)

(In this equation, SumY1=(SumR1+2×SumG1+SumB1)/4.)

Further, when flash light is emitted, the WB control unit 103 calculates the first WB correction value with use of a white detection range 402 corresponding to the flash light as illustrated in FIG. 4B, in a similar manner to the above-described WB correction value calculation method. This is because the flash light is a known light source, so that the white detection range can be limited. Alternatively, when the flash light is emitted, a known value may be set to a WB correction value for the flash light in advance as the first WB correction value.

Next, the method for determining a second white balance correction value (second WB correction value) for a second light source will be described. The WB control unit 103 determines the second WB correction value with use of a value predetermined for each light source. This value is a value prepared by shooting a white image under each light source and calculating a correction value in advance. First, a scene is determined to estimate the light source. For example, as a result of the scene determination, if the light source is determined as a mercury lamp, the WB control unit 103 uses a WB correction value predetermined for the mercury lamp as the second WB correction value. In a case where there is a plurality of types of light sources, the second WB correction value may be variable according to the type of light source. For example, in a case where there are two types of mercury lamps, the WB correction value is varied depending on the respective types of mercury lamps.

Figure 9:
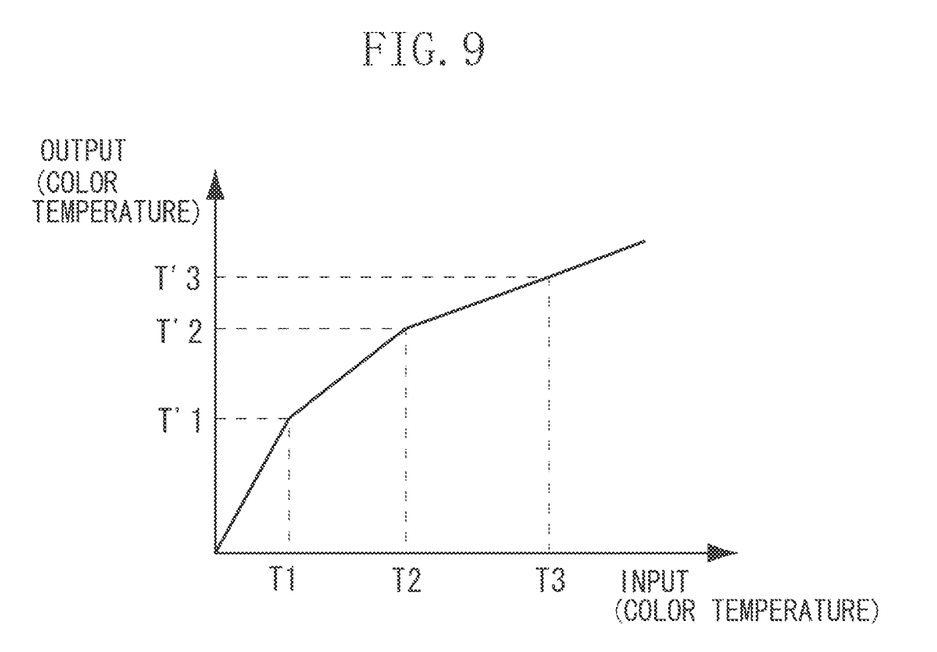
FIG. 9 is a characteristic chart illustrating the relationship between an input and an output when an image is captured using a light source having a low color temperature.

Further, if the background is irradiated with a low color temperature light source such as a light source of the light bulb color when the flash light is emitted, the second WB correction value may be calculated so as to maintain the tint to preserve the mood of the scene. For example, the relationship of color temperatures is set so that an input image is output as an image having a different color temperature, as shown in the relationship illustrated in FIG. 9. In this way, if the white balance is controlled so as to maintain the tint when the color temperature of the second WB correction value is low, for example, an image retaining a red tinge of the light source of the light bulb color can be generated.

Figure 2:
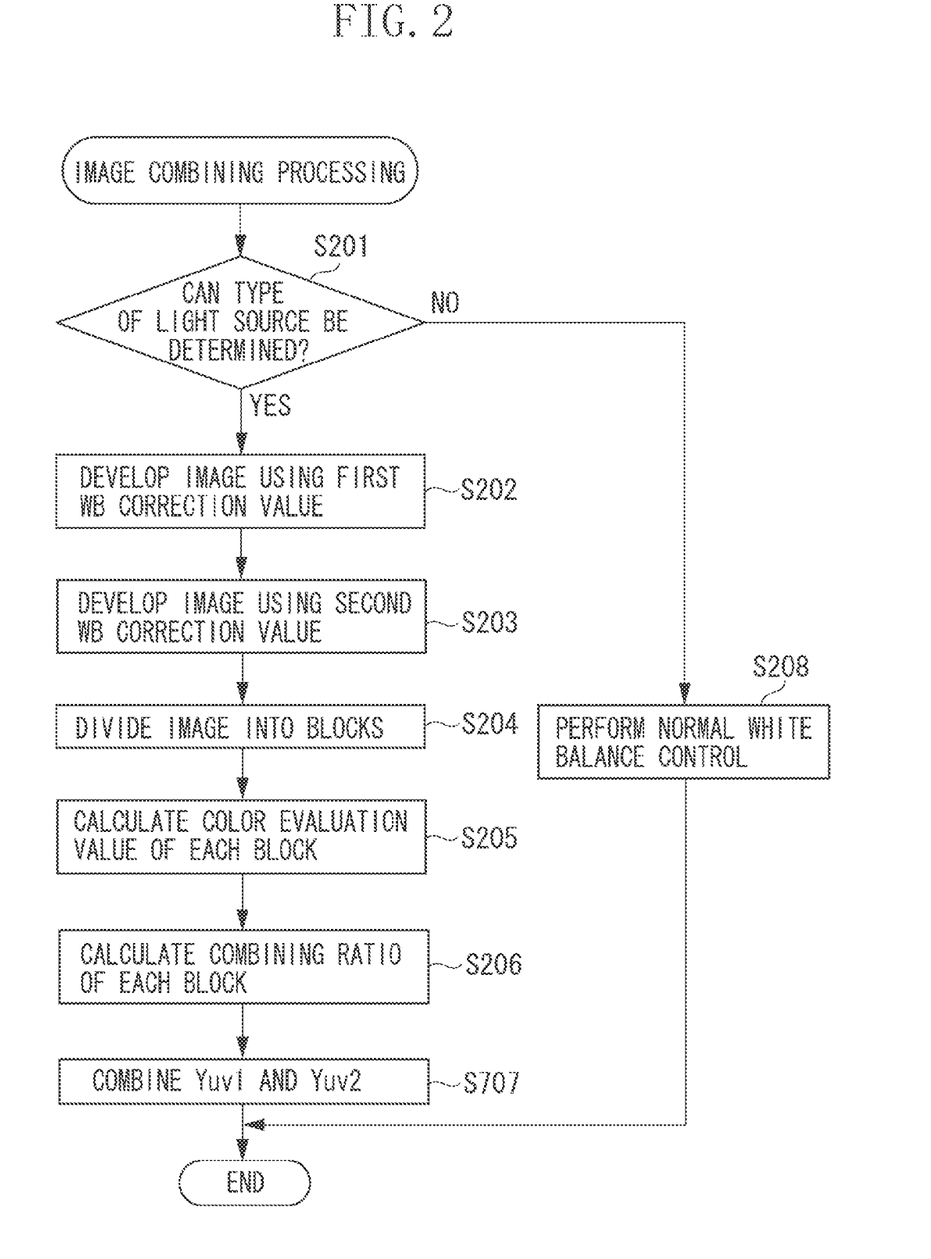
FIG. 2 is a flowchart illustrating an example of a processing procedure for combining images.

Next, image combining processing will be described with reference to the flowchart illustrated in FIG. 2. FIG. 2 is a flowchart illustrating an example of a processing procedure that the WB control unit 103 performs to combine images. First, in step S201, the WB control unit 103 analyzes a scene from an image signal stored in the memory 102, and determines whether the type of the light source can be decided. As a result of this determination, if the type of the light source cannot be decided (NO in step S201), the processing proceeds to step S208 in which the WB control unit 103 performs the normal white balance control with use of the first WB correction value calculated by the procedure illustrated in FIG. 5 without performing the image combining processing. On the other hand, as a result of the determination in step S201, if the type of the light source can be decided (YES in step S201), the processing proceeds to step S202 in which the WB control unit 103 performs the image combining processing.

Subsequently, in step S202, the WB control unit 103 applies the white balance correction with use of the above-described first WB correction value to the image signal stored in the memory 102, and generates a developed image signal Yuv1 as first developed image data. Then, in step S203, similarly, the WB control unit 103 applies the white balance correction with use of the above-described second WB correction value to the image data, and generates a developed image signal Yuv2 as second developed image data. Next, in step S204, the WB control unit 103 divides each of the image signal stored in the memory 102, the developed image signal Yuv1, and the developed image signal Yuv2 into n blocks.

Subsequently, in step S205, the WB control unit 103 adds and averages the pixel values for each color to calculate a color average value (R2[i], G2[i], B2[i]) for each of the blocks in the image signal stored in the memory 102. Further, the WB control unit 103 calculates the color evaluation value (Cx[i], Cy[i]) with use of the above-described equation (3). Alternatively, the WB control unit 103 may use the color evaluation value (Cx[i], Cy[i]) calculated in step S501 without performing any additional processing. At this time, if there is any saturated pixel, the WB control unit 103 may exclude the pixel value of that saturated pixel and the pixel value of a pixel of another color corresponding to that saturated pixel, from the summation processing. For example, if an R pixel is a saturated pixel, the WB control unit 103 excludes the pixel value of that R pixel, and the pixel values of the G pixel and the B pixel corresponding to that R pixel from the summation processing.

Figure 6:
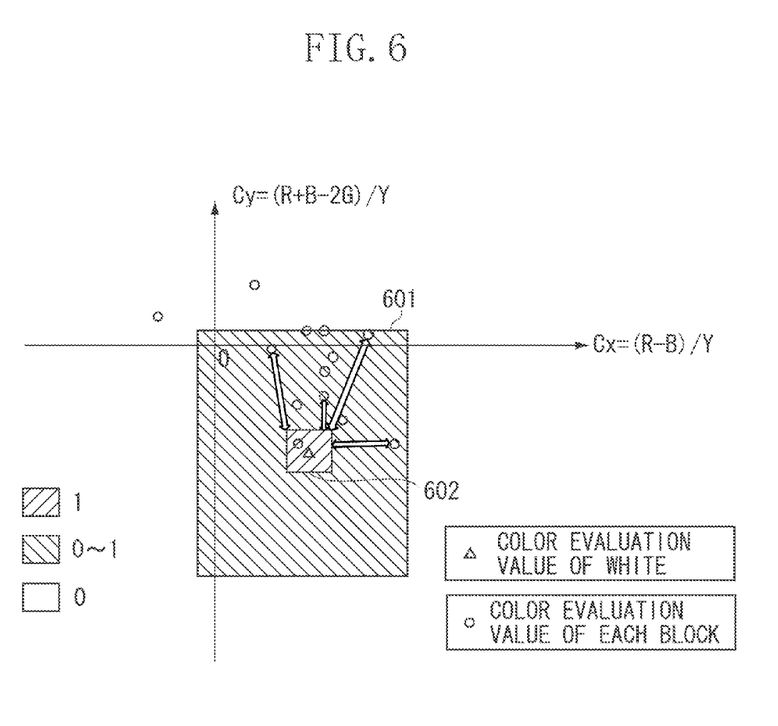
FIG. 6 illustrates an example of the relationship of the color evaluation value for use in calculation of a combining ratio.

Subsequently, in step S206, the WB control unit 103 sets an evaluation frame according to each light source, and calculates a combining ratio of each block based on a difference between the above-described second WB correction value and the color evaluation value of each block. For example, in a scene where the mercury lamp is used as the light source, as illustrated in FIG. 6, the WB control unit 103 sets an evaluation frame 601 for the mercury lamp, in which the color evaluation value of white obtained under the mercury lamp which is predetermined as the second WB correction value is placed in a center. Then, the WB control unit 103 calculates a combining ratio of each block based on the distance between the predetermined color evaluation value of white obtained under the mercury lamp and the color evaluation value of each block. The evaluation frame 601 is set based on the color evaluation value prepared by shooting a white object under the mercury lamp and calculating the color evaluation value thereof in advance.

First, if the color evaluation value of a block has a small difference from the color evaluation value of white obtained under the mercury lamp and is located inside an inner frame 602 illustrated in FIG. 6, the WB control unit 103 sets 1 as the combining ratio α [i] of this block. On the other hand, if the color evaluation value of a block is located in an area between the inner frame 602 and the evaluation frame 601 illustrated in FIG. 6, the WB control unit 103 calculates the combining ratio α [i] of this block as follows; the WB control unit 103 calculates the combining ratio α [i] of this block by linearly reducing the combining ratio from the inner frame 602 toward the evaluation frame 601 such that the inner frame 602 shows the combining ratio α [i]=1 and the evaluation frame 601 shows the combining ratio α [i]=0. Further, if the color evaluation value of a block is located outside the evaluation frame 601, the WB control unit 103 sets 0 as the combining ratio α [i] of this block.

Figure 7:
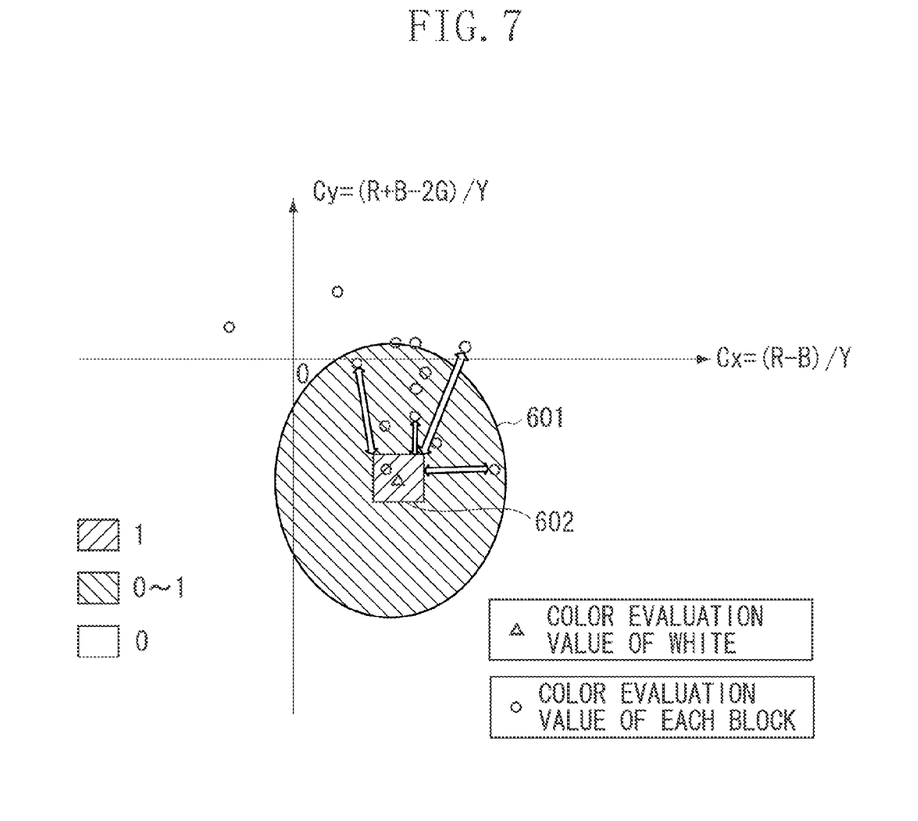
FIG. 7 illustrates another example of the relationship of the color evaluation value for use in the calculation of the combining ratio.
Figure 8:
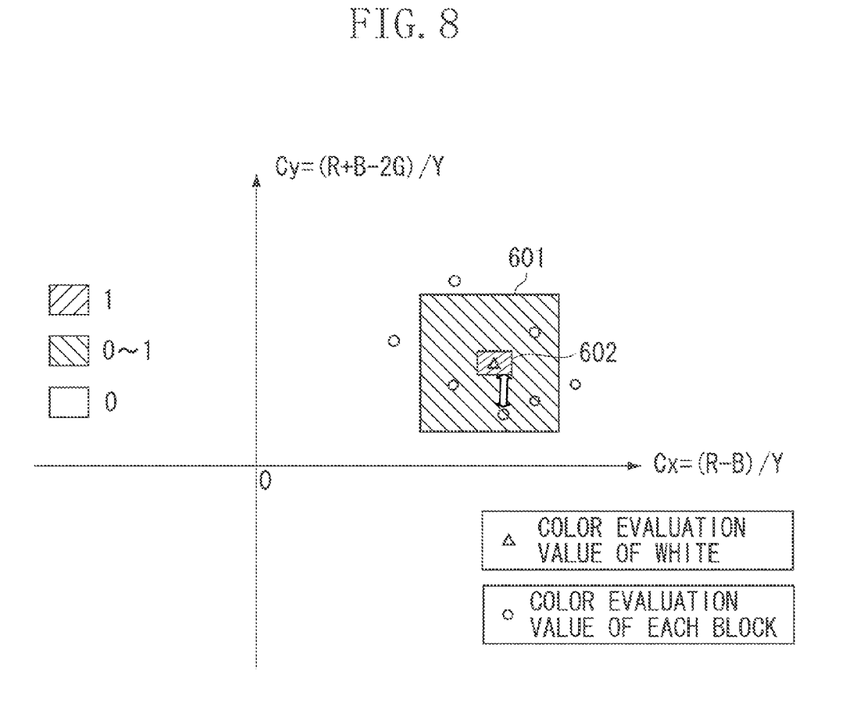
FIG. 8 illustrates an example of the relationship of the color evaluation value when an image is captured using a light source having a low color temperature.

The evaluation frame 601 and the inner frame 602 may have any arbitrary shape, instead of a quadrilateral shape. For example, as illustrated in FIG. 7, the evaluation frame 601 may be set to have an oval (circular) shape. Further, for example, for a scene using a low color temperature light source such as a light source of the light bulb color, this method can also be applied by setting the evaluation frame 601 and the inner frame 602 as illustrated in FIG. 8. In this case, the combining ratio can be calculated by the same processing as the combining ratio calculation method for a scene using the mercury lamp as the light source.

Subsequently, in step S207, the WB control unit 103 combines the developed image signal Yuv1 and the developed image signal Yuv2 with use of the combining ratio α [i] of each block to generate a combined image signal Yuv3. A color evaluation value (Y3[i], u3[i], v3[i]) of the combined image signal Yuv3 is calculated with use of a color evaluation value (Y1 [i], u1[i], v1[i]) of the developed image signal Yuv1 and a color evaluation value (Y2[i], u2[i], v2[i]) of the developed image signal Yuv2. More specifically, the color evaluation value (Y3[i], u3[i], v3[i]) of the combined image signal Yuv3 is calculated by the following equation (6).

$$Y3[i]=Y1[i]\times(1-\alpha[i])+Y2[i]\times\alpha[i]u3[i]=u1[i]\times(1-\alpha[i])+u2[i]\times\alpha[i]v3[i]=v1[i]\times(1-\alpha[i])+v2[i]\times\alpha[i] \quad \text{(EQUATION 6)}$$

At this time, the WB control unit 103 may further perform pixel interpolation processing in step S207 to calculate a combining ratio α' [j] of each pixel from the combining ratio α [i] of each block, so as to reduce a tint variation that may be generated at a boundary between blocks. For example, the WB control unit 103 calculates the combining ratio α' [j] of each pixel from the combining ratio α [i] of each block with use of bilinear interpolation as the pixel interpolation processing. At this time, in step S207, the combined image signal Yuv3 is generated by combining the developed image signal Yuv1 and the developed image signal Yuv2 with use of the combining ratio α '[j] of each pixel. A color evaluation value (Y3[j], u3[j], v3[j]) of the combined image signal Yuv3 is calculated with use of a color evaluation value (Y1[j], u1[j], v1[j]) of the developed image signal Yuv1 and a color evaluation value (Y2[j], u2[j], v2[j]) of the developed image signal Yuv2. More specifically, the color evaluation value (Y3[j], u3[j], v3[j]) of the combined image signal Yuv3 is calculated by the following equation (7).

$$Y3[j]=Y1[j]\times(1\times\alpha'[j]+Y2[j]\times\alpha'[j]u3[j]=u1[j]\times(1-\alpha'[j])+u2[j]\times\alpha'[j]v3[j]=v1[j]\times(1-\alpha'[j])+v2[j]\times\alpha'[j] \quad \text{(EQUATION 7)}$$

Further, the WB control unit 103 may combine only a u component and a v component which are color components to reduce a calculation amount of the circuit. For example, in the image combining processing, the color evaluation value (Y3 [i], u3[i], v3[i]) of the combined image signal Yuv3 is calculated by the following equation (8).

$$Y3[i]=Y1[i]u3[i]=u1[i]\times(1\times\alpha[i])+u2[i]\times\alpha[i]v3[i]=v1[i]\times(1-\alpha[i])+v2[i]\times\alpha[i] \quad \text{(EQUATION 8)}$$

Further, while the above-described image combining processing employs the Yuv format for the developed image signal, but, for example, the RGB format may be employed as the image format. In this case, the WB control unit 103 uses the following equation (9), instead of the equation (6) used in step S207. More specifically, the WB control unit 103 first calculates a color evaluation value (R1[i], G1[i], B1[i]) of a developed image signal RGB1 developed with use of the first WB correction value and a color evaluation value (R2[i], G2[i], B2[i]) of a developed image signal RGB2 developed with use of the second WB correction value. Then, the WB control unit 103 calculates a color evaluation value (R3[i], G3[i], B3[i]) of a combined image signal RGB3 by the following equation (9).

$$R3[i]=R1[i]\times(1-\alpha[i])+R2[i]\times\alpha[i]G3[i]=G1[i]\times(1-\alpha[i])+G2[i]\times\alpha[i]B3[i]=B1[i]\times(1-\alpha[i])+B2[i]\times\alpha[i] \quad \text{(EQUATION 9)}$$

Further, in the above-describe image combining processing, the WB control unit 103 may generate two or more developed images to combine them, if there are two or more types of light sources. For example, if the flash light is emitted in a scene using the mercury lamp, the WB control unit 103 determines a third WB correction value corresponding to the flash light in the same manner as the above-described method for determining the second WB correction value, in addition to the above-described first and second WB correction values. Then, the WB control unit 103 performs the image combining processing by developing three images using the three WB correction values, respectively. Combining ratio for each of the three WB correction values is determined by the ratio between light amounts of three light sources.

In this way, according to the image processing of the present exemplary embodiment, it is possible to generate an image with the main object and the background both tinted with appropriate colors to thereby provide a user with the preferable image, even in a scene where there is a plurality of different types of light sources.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. Each feature disclosed in the description, and (where appropriate) the claims and drawings may be provided independently or in any appropriate combination.

This application claims priority from Japanese Patent Application No. 2010-196827 filed Sep. 2, 2010, which is hereby incorporated by reference herein in its entirety.

What is claimed is:

1. An image processing apparatus comprising:
   correction unit configured to generate first corrected image data by correcting an image data formed by an imaging unit with use of a first white balance correction value corresponding to a first light source, and generate second corrected image data by correcting the image data formed by the imaging unit with use of a second white balance correction value corresponding to a second light source;
   color evaluation value calculation unit configured to calculate a color evaluation value of each of a plurality of areas in the image data; and
   combining unit configured to combine the first corrected image data and the second corrected image data based on the color evaluation values.

2. The image processing apparatus according to claim 1, further comprising:
   first determination unit configured to determine the first white balance correction value corresponding to the first light source from the image data; and
   second determination unit configured to determine the second white balance correction value corresponding to the second light source from the image data.

3. The image processing apparatus according to claim 2, wherein the first determination unit determines the first white balance correction value based on white balance control using a blackbody locus.

4. The image processing apparatus according to claim 2, wherein the second determination unit determines the second white balance correction value with use of a value predetermined for each light source.

5. The image processing apparatus according to claim 1, wherein the combining unit does not perform the combining in a case where a light source for the image data cannot be determined.

6. The image processing apparatus according to claim 1, wherein the combining ratio calculation unit calculates a combining ratio of each pixel by interpolation processing.

7. The image processing apparatus according to claim 1, wherein, in a case where there is a saturated pixel, the color evaluation value calculation unit excludes a pixel value of the saturated pixel and a pixel value of a pixel of another color corresponding to the saturated pixel, from the calculation of a color average value.

8. The image processing apparatus according to claim 4, wherein the second determination unit determines the second white balance correction value to retain a tint of a light source.

9. The image processing apparatus according to claim 1, wherein the combining unit combines only color components of the first corrected image data and the second corrected image data.

10. The image processing apparatus according to claim 1, wherein the correction unit is configured to generate third corrected image data by correcting the image data with use of a third white balance correction value corresponding to a third light source, and wherein the combining unit is configured to combine first, second and third corrected image data.

11. The image processing apparatus according to claim 10, including second determination unit configured to determine the second and third white balance correction values corresponding to the second and third light sources from the image data, with use of a value predetermined for each light source.

12. An image processing method comprising:
   generating, from image data, first corrected image data by correcting the image data with use of a first white balance correction value corresponding to a first light source, and generating second corrected image data by correcting the image data with use of a second white balance correction value corresponding to a second light source;
   dividing the image data into a plurality of blocks;
   calculating a color evaluation value of each of the blocks by adding and averaging values of pixels in the image data for each of the divided blocks;
   calculating a combining ratio based on a difference between the calculated color evaluation value of each block, and a color evaluation value of white under the second light source; and
   combining the first corrected image data and the second corrected image data generated by the correction according to the calculated combining ratio.

13. An image processing method according to claim 12, further comprising:
   determining the first white balance correction value corresponding to the first light source from the image data; and
   determining the second white balance correction value corresponding to the second light source from the image data.

14. A non-transitory computer-readable storage medium storing a program comprising instructions which, when executed by a computer, cause the computer to perform the method of claim 12.

15. The image processing apparatus according to claim 1, wherein the color evaluation value calculation unit calculates the color evaluation value by adding values of pixels in each of a plurality of areas in the image data.

16. The image processing apparatus according to claim 1, wherein combining unit calculates a combining ratio based on a difference between the color evaluation value of each of a plurality of areas in the image data and a color evaluation value of white under the second light source and combine the first corrected image data and the second corrected image data according to the combining ratio.

* * * * *